Patented Sept. 15, 1925.

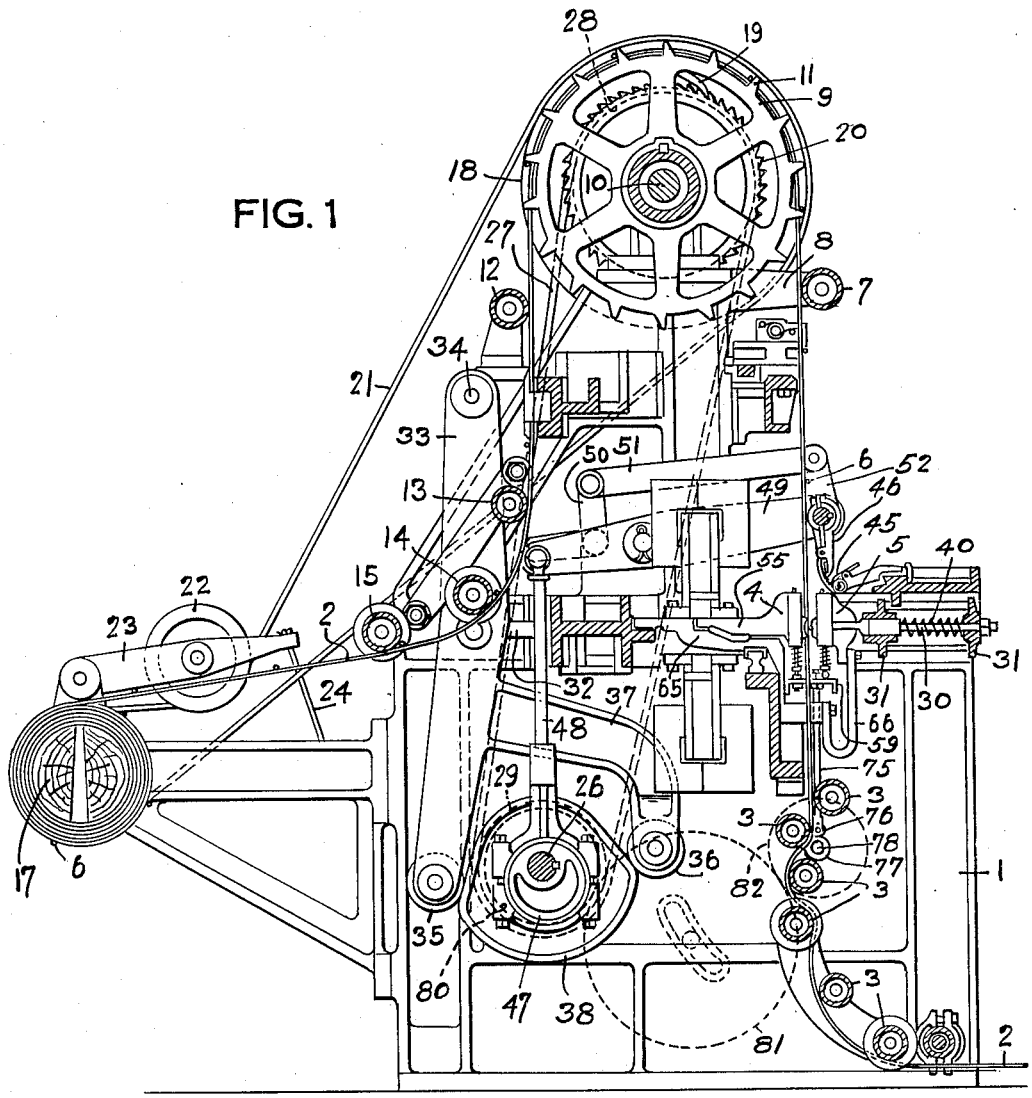

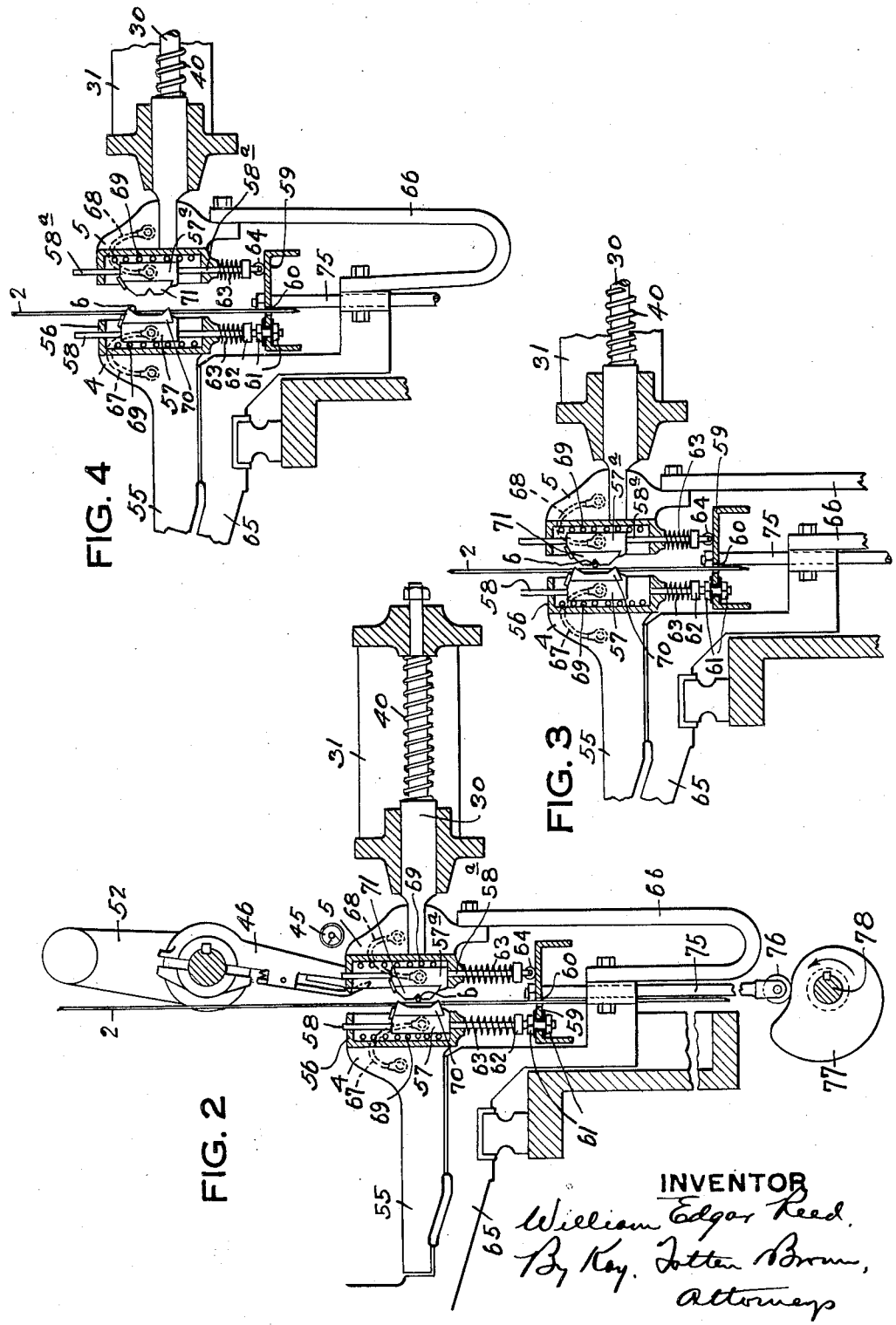

1,554,030

UNITED STATES PATENT OFFICE.

WILLIAM EDGAR REED, OF PITTSBURGH, PENNSYLVANIA.

ELECTRIC WELDING MACHINE.

Application filed May 29, 1922. Serial No. 564,375.

*To all whom it may concern:*

Be it known that I, WILLIAM EDGAR REED, a citizen of the United States, and resident of Pittsburgh, in the county of Allegheny and State of Pennsylvania, have invented a new and useful Improvement in an Electric Welding Machine; and I do hereby declare the following to be a full, clear, and exact description thereof.

My invention relates to electric welding machines and has particular reference to machines for making metal fabric consisting of stay wires applied to strand wires and electrically welded thereto at the points of intersection.

The object of my invention is to provide a machine of the character indicated in which the strand wires shall be advanced continuously, without stopping them each time that a stay wire is applied, and in which the welding operation shall be performed by means of electrodes that reciprocate toward and from each other.

The specific manner in which I employ reciprocating electrodes, and at the same time produce continuous operation, consists in mounting each pair of cooperating electrodes on supports, one of which may reciprocate toward the other, and so mounting the electrodes on their supports that they are permitted to slide lengthwise in the direction of movement of the strand wires. I provide means for moving the electrode slides with the work and at the same speed as the speed at which the strand wires are advanced, and also for returning the electrode slides to their starting position after each weld is completed. This reciprocating movement of the electrode slides, in combination with the reciprocating movement of the slide holders toward and from each other, is so timed that the cooperating electrodes of each pair are moved together to grip an intersecting strand wire and stay wire, are advanced in the same direction and at the same speed as the strand wire while being pressed together to complete the weld and, after the weld is completed, are separated and caused to return to the starting position, ready to be closed again upon the next succeeding joint of the fabric.

For the purpose of illustrating my invention, in the accompanying drawings, but without limiting my invention to the machine here shown, I have selected as the basis for the general construction of the machine the apparatus shown in the United States patent to Perry, No. 813,823. The machine described in this patent is of a well-known type in which a set of strand wires is fed intermittently through the machine, and stay wires are applied to the strand wires and welded in place by means of reciprocating electrodes in the intervals between the advancing movements of the strand wires.

As applied to this particular type of machine, my present invention results in doubling the speed and output of the machine, since the advancing movement of the fabric is continuous and not intermittent. It will be understood, however, that my invention is not restricted to use with the machine of the Perry patent or to the specific details herein disclosed, since the principle of my invention may be employed in a variety of ways.

In the accompanying drawing, Fig. 1 is a side elevational view, with parts in section, of a complete machine having the general construction shown in the Perry patent mentioned above, but having welding electrodes constructed and operated in accordance with my invention; Fig. 2 is a vertical sectional view through a portion of the machine, showing the construction of one set of welding electrodes and the position of these electrodes at the beginning of a welding operation; Fig. 3 is a vertical sectional view similar to a portion of Fig. 2, showing the position of the electrodes at or near the end of the welding operation; and Fig. 4 is another vertical sectional view similar to Fig. 3, showing the position of the electrodes just after being separated at the end of the welding operation and before the electrode slides have returned to their starting position.

Fig. 1 of the drawing shows so much of a wire fabric welding machine as is necessary to an understanding of my present invention, reference being had to the above-mentioned United States Patent No. 813,823 for a more detailed description of the construction and operation of this machine. As shown in Fig. 1, the operative parts of the machine are mounted upon a frame-work 1. The strand wires 2 are fed into the bottom of the machine in spaced relation and parallel to one another, the exact number and spacing of the strand wires depending upon the character of the fabric to be produced. These strand wires are conducted over rollers 3 which straighten the wires, and thence each strand wire passes vertically upward between welding heads indicated generally by the numerals 4 and 5, where stay wires 6 are fed across the strand wires and are welded to the strand wires in the manner described below. The fabric thus produced by welding the stay wires 6 to the strand wires 2 then proceeds vertically upward, being guided by a roll 7 carried by arms 8 and thence over a series of feed wheels 9 rigidly mounted upon a horizontal shaft 10 and provided with teeth 11 which engage the stay wires 6 and thereby advance the fabric, which passes vertically downward from the feed wheels 9, guided by rolls 12, 13, 14 and 15, and is finally wound upon a split roll 17. For the purpose of driving the roll 17 to wind up the fabric as fast as it is produced, a pulley 18 is mounted loosely on one end of the shaft 10, and is provided with a spring pawl 19 which engages a ratchet wheel 20 secured rigidly to the shaft 10. By this arrangement the pulley 18 is turned by the shaft 10, but may be turned in the same direction by hand in order to take up the slack when starting a new roll of material, or for any other purpose. A belt 21 extends around the pulley 18 and also around the corresponding pulley on the shaft 17, the tension of the belt 21 being regulated by means of a roller 22 carried by an arm 23 and resting on the belt 21 with a pressure which is controlled by means of an adjustable tension member 24.

The shaft 10 is driven continuously from a power shaft 26 by means of an endless chain 27 passing around sprocket wheels 28 and 29 secured to the shafts 10 and 26, respectively. The sprocket wheels 28 and 29 are so proportioned as to advance the strand wires at the proper speed.

As in the above-mentioned Patent No. 813,823, the welding heads 4 are stationary, and the welding heads 5 are reciprocated horizontally toward and from the head 4. For this purpose the heads 5 are carried by horizontal arms 30 which are mounted slidably in a movable girth 31 which extends the full width of the machine and has its ends connected by means of pitmen 32 to levers 33, one of which is shown in Fig. 1, and which are pivoted at 34 to the framework of the machine, and carry cam rollers 35 and 36, the latter rollers being mounted on arms 37. Each pair of rollers 35 and 36 runs upon a cam 38 secured to the power shaft 26. As the shaft 26 rotates, the cams 38 rock the levers 33 upon their pivots 34, thereby moving the girth 31 toward and from the fixed welding head 4. The girth 31 carries with it the arms 30 which, however, are not rigidly connected to the girth 31, but are moved toward the fixed head 4 through strong coil springs 40, one of which is carried by each of the arms 30, as shown in Fig. 1, so that each of the welding heads 5 has a certain amount of yielding movement independent of the movement of the girth 31.

The means by which the stay wires 6 are applied to the strand wires form no part of my present invention, and it is sufficient to state that the stay wires are fed into the machine at the point 45, and after being severed are carried into position against the strand wires by means of rocking grippers 46 which are given a combined swinging and reciprocating movement by power derived from the shaft 26 through an eccentric 47, a connecting rod 48, a lever 49, links 50 and 51, and a lever 52.

As stated above, my invention is particularly concerned with the welding heads 4 and 5. The head 4 consists of a copper bar 55 having an enlarged head provided with a flange 56 forming a box-like receptacle for a welding jaw 57. The jaw 57 is mounted on a vertical rod 58 which extends through upper and lower openings in the flange 56 and is extended downwardly through an opening in a channel bar 59 which extends the full width of the machine and is provided with openings 60 to admit the strand wires 2. Each of the vertical rods 58 is insulated from the bar 59 by means of suitable insulating washers and bushings, and is secured to the bar 59 by means of nuts 61 above which the rod 58 carries a collar 62. A spring 63 is compressed between the collar 62 and the under side of the flange 56, and tends to force the collar 62 downwardly, thereby assisting the downward movement of the channel bar 59.

The movable head 5 is similar in construction to the head 4, with this exception, that its vertical rod 58ª is not rigidly secured to the channel bar 59, but has its lower end resting slidably upon the upper surface of the channel bar 59, and for this purpose is preferably provided with a roller 64. Instead of employing the rollers 64, the lower ends of the rods 58ª may be specially hardened or provided with thimbles of hardened metal in order to reduce wear.

The bar 55 of the head 4 is connected to one terminal of the secondary winding of a transformer, according to the usual practice in machines of this kind. The other terminal of the secondary winding is connected to the head 5 through a copper bar 65, to the lower and forward end of which is connected a flexible loop 66 composed of copper strips. The other end of the loop 66 is connected to the movable head 5. A flexible conductor 67 is connected to the bar 55 and to the sliding welding jaw 57, and a similar flexible conductor 68 connects the head 5 with its corresponding welding jaw 57ª. By this arrangement the electric circuit through the secondary winding of the transformer is completed only when the welding jaws 57 and 57ª are brought together to grip the joint between a strand wire and a stay wire, and is broken as soon as these welding heads are moved apart. As a modification the current may be brought to the movable welding heads through the bearing surface of the vertical slides instead of through flexible conductors.

Each of the sliding welding jaws 57 and 57ª is mounted for vertical reciprocation on ball bearings or roller bearings, indicated somewhat diagrammatically at 69 on Figs. 2, 3 and 4, and the welding jaws may be provided with removable contact members 70 and 71.

The horizontal channel bar 59 is raised and lowered in timed relation with the feed of the strand wires and the horizontal movement of the welding head 5. For this purpose the channel bar 59 is supported on two or more vertical rods 75 which extend through suitable guides and carry at their lower ends cam rollers 76 running upon cams 77 carried by a horizontal shaft 78 which is driven from the power shaft, 26 through suitable adjustable gearing that consists, as shown, of a spur gear 80, meshing with an idler gear 81 which meshes with a gear 82 secured to the cam shaft 78.

Fig. 2 shows the position of the parts at the time when a stay wire 6 has been laid upon the strand wires 2, and the girth 31 has been moved to the left sufficiently to clamp the intersections of the strand and stay wires between the contact members of the welding jaws. When this contact is effected, the sliding jaws 57 and 57ª have begun to move upward at the same speed as the strand wires, this upward movement being produced by the cams 77 which act through the rollers 76 and the rods 75 to raise the channel bar 59 and with it the vertical rods 58 and 58ª which carry the welding jaws 57 and 57ª. The position of the parts near the end of this movement is shown in Fig. 3. The upward movement of the welding jaws is made long enough to complete the welds, immediately after which the girth 31 is withdrawn, as shown in Fig. 4, thereby releasing the welded joints and permitting the strand wires to continue their advance without interruption. When the welding heads are thus separated, the cam 77 permits the channel bar 59 to descend, this downward movement being assisted by the springs 63 which surround the rods 58 and 58ª, and the sliding jaws 57 and 57ª are thereby returned to their starting positions.

The sliding jaw 57 thus reciprocates vertically during each welding operation while the jaw 57ª has a four-way movement produced by the combination of the horizontal movement of the girth 31 and the vertical movement of the channel bar 59, this four-way movement consisting first in a horizontal movement toward the joined wires to be welded, next a vertical movement in coöperation with the vertically moving head 57, next a horizontal movement away from the finished joint, and lastly a downward vertical movement to the starting position.

The principle of my invention may be employed not only in machines where the strand wires are fed vertically, but also in machines where the strand wires are fed horizontally and the stay wires or rods are placed upon the strand wires before welding. This is especially desirable in making heavy fabric for road reinforcement and for similar purposes.

As a modification of the construction herein shown, the positive means for reciprocating the slides on the welding heads may be omitted, and the movement of the work may be relied upon to drag the slides with the work during the welding operation, in which case the slides would be returned to their starting position when the electrodes are separated by means of suitable springs such as the springs 63. However, I prefer to provide positive means for reciprocating these slides, in order to insure that the slides will be moved at the correct intervals and through the correct distances.

The welding electrodes may be relied upon to feed the fabric through the machine, but this is not ordinarily desirable, since the continuous operation of the machine is not possible if the electrodes act also as the feeding means.

Suitable means may be added to the machine for crimping the fabric, such means consisting either of blocks mounted in slide ways and movable with the work while crimping, and then returned to their original positions by means of springs; or of wheels mounted on stationary shafts and revolving during the crimping process. Since such crimping devices are well known in this art, it is not deemed necessary to illustrate them on the drawing.

Various other changes may be made in the construction which I have shown and described, and I wish it to be understood that my invention includes broadly any arrangement by which reciprocating welding electrodes are caused to advance with moving work, and that my invention is limited only by the scope of the appended claims.

I claim as my invention:

1. Electric welding apparatus comprising mechanism for continuously feeding material to be welded, reciprocally mounted electrodes for welding said material at predetermined points longitudinally thereof, means for effecting engagement between said electrodes and the material and causing said electrodes to advance with the material for a distance less than that between two of said points, and means for returning said electrodes to retracted position.

2. Electric welding apparatus comprising mechanism for continuously feeding material to be welded, reciprocally mounted electrodes for welding said material at predetermined points longitudinally thereof, means for effecting engagement between said electrodes and the material and causing said electrodes to advance with the material for a distance less than that between two of said points, means for separating the electrodes from said material when in advanced position, and means for returning said electrodes to initial position and causing them to engage the material at another one of said predetermined points.

3. Electric welding apparatus comprising a pair of welding heads, slides carried by said heads, co-operating contact members carried by said slides, means for continuously advancing the material to be welded, and means for reciprocating said slides upon said heads in a path parallel to the line of movement of said material.

4. Electric welding apparatus comprising a pair of welding heads, anti-friction bearings carried by said heads, electrodes mounted slidably in said bearings, flexible means for conducting current to said sliding electrodes, and means for reciprocating said electrodes in said heads.

5. Electric welding apparatus comprising a pair of welding heads, cooperating electrodes slidably mounted in said heads, and means for reciprocating said electrodes comprising rods extending from said electrodes, a movable bar engaging said rods, and cam-operated means for reciprocating said bar, one of the said rods having one end secured to said bar, and the other rod having its end resting slidably against said bar.

6. Electric welding apparatus comprising a pair of welding heads provided with opposed flanges, cooperating electrodes slidably mounted on antifriction bearings within said flanges, flexible conductors for conducting current to said electrodes, rods carrying the said electrodes and extending through openings in said flanges, springs surrounding said rods and tending to hold said electrodes in their lowest position, a bar disposed below said heads and connected to one of said rods, the end of the other rod resting upon said bar, and cam-operating means for raising and lowering said bar.

7. In a machine for making electrically welded metal fabric, the combination with means for continuously advancing a set of strand members and means for applying stay members to said strand members, of means for electrically welding said strand members and stay members at their points of intersection, the said welding means comprising two sets of welding heads, means for moving one of said heads toward and away from the other, and welding contact members carried by said heads and movable during the welding operation in the direction of movement of said strand members for a distance less than that between two adjacent stay members.

8. In a machine for making electrically welded metal fabric, the combination with means for continuously advancing a set of strand members and means for applying stay members to said strand members, of means for electrically welding said strand members and stay members at their points of intersection, the said welding means comprising two sets of welding heads, means for moving one of said heads toward and away from the other, welding contact members carried by said heads, and means for moving said contact members during the welding operation in the direction of movement of said strand members for a distance less than that between two adjacent stay members.

9. In a machine for making electrically welded metal fabric, the combination with means for continuously advancing a set of strand members and means for applying stay members to said strand members, of means for electrically welding said strand members and stay members at their points of intersection, the said welding means comprising two sets of welding heads, means for moving one of said heads toward and away from the other, welding contact members carried by said heads, and means for reciprocating said contact members transversely with respect to the direction of movement of said heads for a distance less than that between two adjacent stay members, to engage and disengage said strand and stay members.

In testimony whereof I, the said WILLIAM EDGAR REED, have hereunto set my hand.

WILLIAM EDGAR REED.